US012586041B2

(12) United States Patent
Moyal et al.

(10) Patent No.: US 12,586,041 B2
(45) Date of Patent: Mar. 24, 2026

(54) COMPUTATIONAL CAPABILITY BASED ON VEHICLE MAINTENANCE

(71) Applicant: INTERNATIONAL BUSINESS MACHINES CORPORATION, Armonk, NY (US)

(72) Inventors: Shailendra Moyal, Pune (IN); Nitika Sharma, Zirakpur (IN); Sarbajit K. Rakshit, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 17/741,705

(22) Filed: May 11, 2022

(65) Prior Publication Data

US 2023/0368153 A1 Nov. 16, 2023

(51) Int. Cl.
*G06Q 10/20* (2023.01)
*G06Q 10/047* (2023.01)

(52) U.S. Cl.
CPC ........... *G06Q 10/20* (2013.01); *G06Q 10/047* (2013.01)

(58) Field of Classification Search
CPC .............................. G06Q 10/20; G06Q 10/047
USPC .......................................................... 703/8
See application file for complete search history.

(56) References Cited

U.S. PATENT DOCUMENTS

| | | | | |
|---|---|---|---|---|
| 2019/0266295 A1* | 8/2019 | Masuda | ................. | G06Q 50/40 |
| 2019/0384870 A1* | 12/2019 | Shiraishi | ................ | G06Q 40/08 |

| | | | | |
|---|---|---|---|---|
| 2021/0272394 A1 | 9/2021 | Cella | | |
| 2021/0314417 A1 | 10/2021 | Chen | | |
| 2022/0014946 A1 | 1/2022 | Merwaday | | |
| 2025/0033517 A1* | 1/2025 | Hancock | ................. | B60L 53/66 |

FOREIGN PATENT DOCUMENTS

| | | | | |
|---|---|---|---|---|
| CN | 108845885 A | * | 11/2018 | ........... G06F 9/4881 |
| CN | 111781933 A | * | 10/2020 | ........... G05D 1/0251 |
| CN | 113645201 A | * | 11/2021 | ........... G06F 18/211 |
| CN | 114049768 A | | 2/2022 | |
| CN | 114649768 A | * | 6/2022 | ............... H02B 1/36 |

OTHER PUBLICATIONS

"Method and System for Simulating Edge Computing Capabilities with Virtual Reality System", An IP.com Prior Art Database Technical Disclosure, Authors et al.: Disclosed Anonymously, IP.com No. IPCOM000264854D, IP.com Electronic Publication Date: Jan. 31, 2021, 5 pages.
International Search Report and Written Opinion, International Application No. PCT/CN2023/086835, International Filing Date Apr. 7, 2023.

* cited by examiner

*Primary Examiner* — John E Johansen
(74) *Attorney, Agent, or Firm* — Monchai Chuaychoo

(57) ABSTRACT

An approach for reducing edge computing resources associated with autonomous vehicle infrastructure is disclosed. The approach utilizes digital twin computing to create a digital copy of the autonomous vehicle and edge computing demand. The approach can simulate the entire journey of the autonomous vehicle(s) on a travel path to determine the edge computing resources requirements. And based on the generated data set, the approach provides recommendations of proactive vehicle maintenance plan to improve edge computing capability of the vehicle based on the selected route. Other recommendation can include identifying whether road maintenance is to be performed for optimum usage of edge computing capability.

20 Claims, 4 Drawing Sheets

300

300

302

RECEIVING DATA

304

GENERATING DIGITAL TWIN

306

ANALYZING DATA

308

CREATING PLAN

310

EXECUTING PLAN

400

402 MEMORY

405 PERSISTENT STORAGE

407 COMMUNICATIONS UNIT

404

401 PROCESSOR(S)

403 CACHE

406 I/O INTERFACE(S)

408 EXTERNAL DEVICE(S)

410 DISPLAY

COMPUTATIONAL CAPABILITY BASED ON VEHICLE MAINTENANCE

BACKGROUND

The present invention relates generally to autonomous vehicle, and more particularly to using digital twin technology to edge computing capabilities related to the autonomous vehicle.

Edge computing moves more computational power and resources closer to end users by increasing the number of endpoints and locating them nearer to the consumers (e.g., users or user devices). For example, user devices can include autonomous vehicles. Thus, autonomous vehicles can connect to the edge computing infrastructure to improve safety, enhance efficiency, reduce accidents and decrease traffic congestion.

While autonomous vehicles are operating on the road, then these vehicles can be collaborating with each other to by leveraging edge computation. Based on the edge computation results, the vehicles can be given driving decisions. Edge computing effectiveness can depend on number of available vehicles to participate in edge computing, and the contextual situation for which the edge computing resource is required. For example, edge computing capability can control, how effectively the vehicles are addressing the contextual situation, what will be the speed of the vehicles, etc.

SUMMARY

Aspects of the present invention disclose a computer-implemented method, a computer system and computer program product for reducing edge computing resources associated with autonomous vehicle. The computer implemented method may be implemented by one or more computer processors and may include: receiving data associated with autonomous vehicle; generating a digital twin copy of the autonomous vehicle based on the received data; analyzing the digital twin copy; creating an action plan based on analysis; and outputting the action plan.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
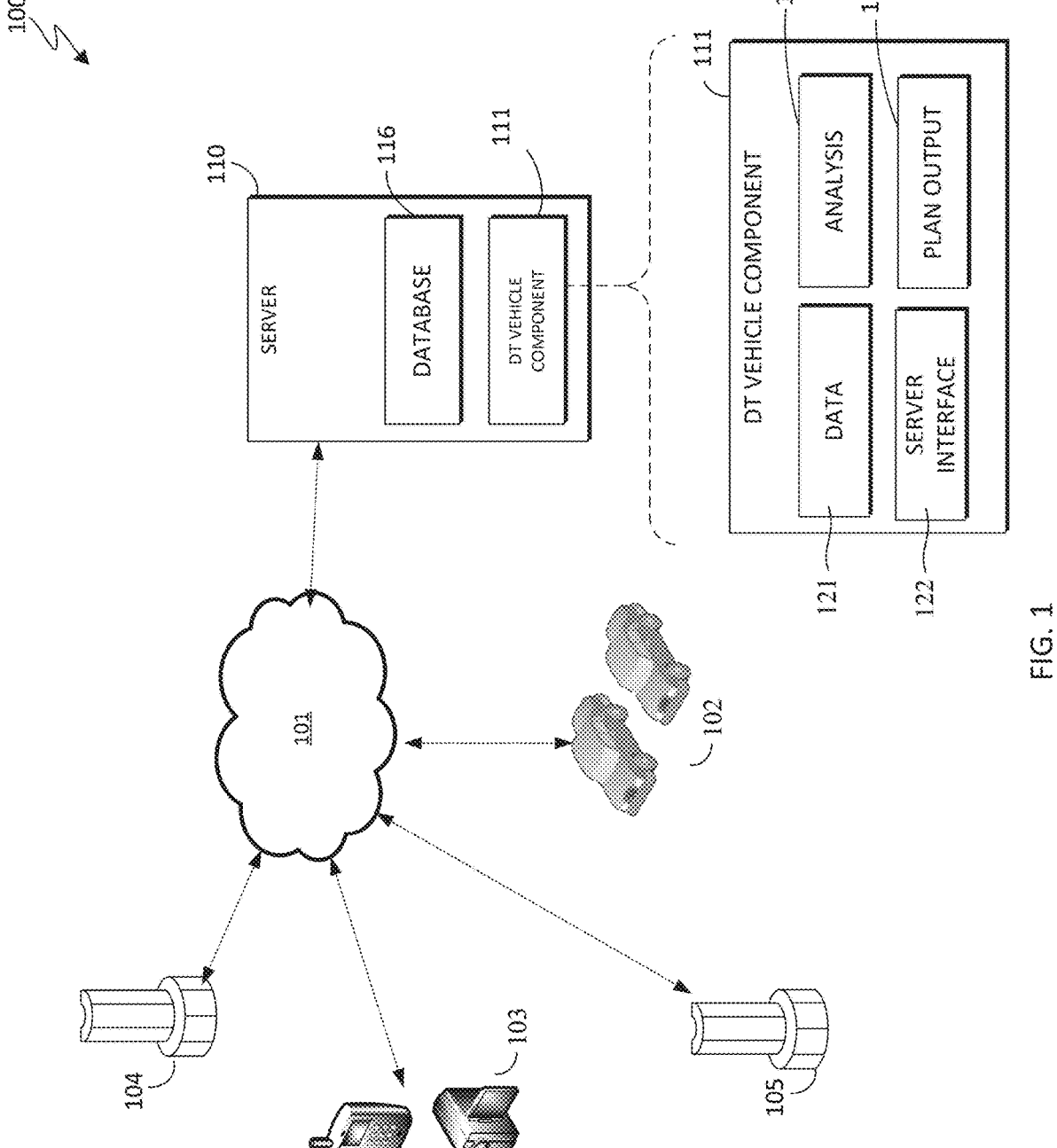
FIG. 1 is a functional block diagram illustrating a high-level overview of the DT vehicle environment, designated as 100, in accordance with an embodiment of the present invention.

Digital twin leverages IoT, artificial intelligence (i.e., leveraging machine/deep learning) and software analytics to create living digital simulation models that update and change as their physical counterparts change. A digital twin continuously learns and updates itself from multiple sources, including IoT and sensors, to represent its near real-time status. A digital twin also integrates historical data from past machine usage to factor into its digital model. What is a simulation? A simulation is an approximation of a process and/or a system. The main difference between a simulation versus a digital twin model is that a simulation can help understand what may happen in the real world while a digital twin representation knows what is happening (i.e., real-time based on IoT and sensors).

There are several concerns with autonomous vehicle and edge computing. While travelling in any road, there can be various contextual situations, and each different contextual situation will require different computational need. For example, the contextual situation can include, road condition, weather condition, number of available vehicles, accidental condition etc. where the computational need can be identified based on the edge computing capability of the vehicles. In this case, the vehicles may not have the required edge computational capabilities to address all of contextual situation. Thus, there is a need for additional computing capability so that autonomous vehicles can travel through the road safely and efficiently.

Embodiments of the present invention provides an approach for providing capability to the autonomous vehicle. The approach simulates the entire journey of the autonomous vehicles on a path to determine the edge computing resources requirements by leveraging the use of digital twin technology (via simulation). And based on the generated data set, the approach provides recommendations of proactive vehicle maintenance plan to improve edge computing capability of the vehicle based on the selected route. Furthermore, digital twin simulations can not only represent actual states, but can also reproduce historical states and simulate future states.

Also, the approach proposes an adaptive maintenance plan based on changes to the contextual need of the vehicles that is travelling on the same route to maintain the need of resources. It also maintains the attributes of the vehicles and road maintenance to provide complete optimum maintenance plan for effective journey by all the vehicles/autonomous vehicles.

Other embodiments of the present invention may recognize one or more of the following facts, potential problems, potential scenarios, and/or potential areas for improvement with respect to the current state of the art: i) analyzing the edge computing capabilities of each, and every autonomous vehicle traveling through a route, and thus, identifying optimum number of vehicles that needs maintenance so that with a lesser amount of maintenance time the vehicles can travel through the route, and ii) using digital twin simulation for identifying optimum maintenance plan between vehicles and the road and identifying if vehicle maintenance is to be performed or road maintenance is performed for an optimum usage of edge computing capability.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a DT vehicle environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

DT vehicle environment 100 includes network 101, autonomous vehicle 102, sensors 103, edge computing 104, digital twin server 105 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, sensors 103, autonomous vehicle 102 and other computing devices (not shown) within DT vehicle environment 100. It is noted that other computing devices can include, but is not limited to, autonomous vehicle 102, edge computing 104, digital twin server 105 and any electromechanical devices capable of carrying out a series of computing instructions.

Autonomous vehicle 102 are vehicles with full-self driving capabilities. The vehicles may contain two or more wheels as a means of propulsion.

Sensors 103 can be any smart device (e.g., IoT, IP camera, etc.) used for detecting objects, chemical compounds/elements, auditory signals, electromagnetic signal and images. Sensors 103 can include IoT devices, such as, cameras, olfactory, thermal sensors/imaging, microphones, and chemical detectors.

Edge computing 104 is a distributed computing system that brings computing power closer to the users, consumers and devices associated with consumers/users. However, in this invention, edge computing refers to resources/infrastructure of a typical edge computing infrastructure but it is specific used for various computation (e.g., plotting a route, etc.) needs associated with an autonomous vehicle.

Digital twin server 105 can be servers used to simulate the digital twin of DT vehicle environment 100. Digital twin server 105 can communicate with sensors 103 to update the simulation status. Furthermore, digital twin server 105 can communicate with other computing devices (i.e., edge computing 104) and/or directly with the autonomous vehicles.

Server 110 and digital twin server 105 can be a standalone computing device, a management server, a web server, a mobile computing device, or any other electronic device or computing system capable of receiving, sending, and processing data. In other embodiments, server 110 and digital twin server 105 can represent a server computing system utilizing multiple computers as a server system, such as in a cloud computing environment. In another embodiment, server 110 and digital twin server 105 can be a laptop computer, a tablet computer, a netbook computer, a personal computer (PC), a desktop computer, a personal digital assistant (PDA), a smart phone, or any other programmable electronic device capable of communicating other computing devices (not shown) within DT vehicle environment 100 via network 101. In another embodiment, server 110 and digital twin server 105 represents a computing system utilizing clustered computers and components (e.g., database server computers, application server computers, etc.) that act as a single pool of seamless resources when accessed within DT vehicle environment 100.

Embodiment of the present invention can reside on server 110. Server 110 includes DT vehicle component 111 and database 116.

DT vehicle component 111 provides the capability of gathering historical and/or real-time data from sensors 103 (and other sources) associated with the edge computing 104 combined with a corpus knowledge of autonomous vehicle, weather/traffic patterns, transportation routes, edge computing and running a simulation using twin digital computing. DT vehicle component 111, based on the result of the simulation, can create an action plan based on the result (e.g., recommend maintenance plan for the autonomous vehicle, recommend more/less edge computing resources for the autonomous vehicle traveling along a path).

In the depicted embodiment, DT vehicle component 111 includes data component 121, server interface component 122, analysis component 123 and plan output component 124.

As is further described herein below, data component 121 of the present invention provides the capability of retrieving various data (e.g., historical vehicle maintenance log, real-time IoT devices, traffic/weather pattern along a particular route, real-time vehicle conditions/position, previous historical simulations from the digital twin server, etc.) and send the necessary data to the analysis component 123 and/or server interface component 122.

As is further described herein below, server interface component 122 of the present invention provides the capability of communicating and managing edge computing 104 and digital twin server 105. Server interface component 122 can communicate with edge computing 104 to determine resources and requirement being used by one or more autonomous vehicle. Server interface component 122 can communicate with digital twin server 105 to manage simulations and send/receive data required via data component 121.

As is further described herein below, analysis component 123 of the present invention provides the capability of, but it is not limited to, i) determining edge computing resourced required for traveling by performing various simulations on the digital twin version of the autonomous vehicle and ii)

determining preventative action plans that may be required to lessen computing resources from edge computing. Analysis component 123, through server interface component 122, can communicate with edge computing 104 and digital twin server 105 to run various simulations based on data gathered by data component 121.

There is a digital twin version of one or more autonomous vehicle existing on the digital twin platform that mirrors the real-world situation/context. Sensor devices along the road and/or sensors located on the vehicle can provide real-time updates to, but it is not limited to, vehicle position, vehicle health status, road conditions, etc. Furthermore, the digital twin version of the vehicle includes the real-time edge computing resources utilized as part of the digital twin scenario. Thus, analysis component 123 can model and simulate various scenarios based on the digital twin version (e.g., edge computing resource usage and autonomous vehicle status/usage, etc.). For example, the various scenarios can be influenced by the following factor such as, i) contextual situation in any route during travel (e.g., weather, road condition, etc.), ii) the predicted number of vehicles that will be available on the route during travel to participate in edge computation and iii) driving rules (e.g., speed limits, etc.) along the route.

Goals of the simulations are based on a travel requirements. Travel requirements are user defined criteria that are used to determined whether the various scenarios/simulations are able to meet that criteria (i.e., exit criteria). Travel requirements can include, but it is not limited to, reduction in resources of edge computing associated with that one or more autonomous vehicles, minimizing vehicle down time due to non-functional vehicles, reducing travel time, maximizing passenger pickup during one trip and reducing dead mileage.

One goal of the scenarios can include a simulation of the entire journey/route of a particular autonomous vehicle to identify how much edge computing resource will be required for traveling, and if that particular vehicle is required more or less edge computing capability. Furthermore, if that vehicle will need proactive maintenance of the vehicles to improve edge computing capability of the vehicles before travelling on the selected route.

Other scenarios can make use of IoT feeds or sensor data about current health of all vehicle components and devices which may influence the vehicle performance with context and change in context.

Another scenario may involve the use of historical data about vehicle maintenance and component status from maintenance and service data to prioritize the vehicles over other vehicles for optimum maintenance plan.

As is further described herein below, plan output component 124 of the present invention provides the capability of making recommendations or creating an action plan based on the result from the analysis component 123. It is noted that an action plan can include several recommendations. The term action plan and recommendations maybe used interchangeably as it relates to the result of the analysis. One recommendation may include identifying optimum number of vehicles that needs maintenance. This can be based on analyzing edge computing capabilities of each, and every vehicle travelling through the route, wherein the goal is to lessen the amount of maintenance time for vehicles that can travel through the route.

Another recommendation may include recommending which part of the vehicle needs maintenance based on the created model of edge computing resource consumption. This can be based on simulations that utilized historical data such as, how vehicle computing resources are being utilized by various parameters, and the level of influencing factors. These influencing factors can include, if the road condition is poor then, then the edge computing resource consumption is increased to address the road condition (i.e., wherein a mechanical system of the autonomous vehicle consumes more edge resources like dynamic tire pressure control because of changing/poor road condition etc.).

Another recommendation may include identifying optimum maintenance plan between vehicles and the road and will identify if vehicle maintenance is to be performed or road maintenance is performed for optimum usage of edge computing capability.

Another recommendation may include identifying what types of input data connection modules based on analyzing the contextual situation on any route. And another related recommendation may include identifying if the vehicles will be able to capture the input data with required quality and will be recommending proactive maintenance of the vehicles so that required data can be captured while travelling in the route.

Database 116 is a repository for data used by DT vehicle component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within DT vehicle environment 100, provided that DT vehicle component 111 has access to database 116. Database 116 may store information associated with, but is not limited to, knowledge corpus relating to, weather forecast, traffic pattern, road conditions, location of all autonomous vehicles, locations of all passengers (e.g., on a ride, waiting for a ride, exiting, etc.), health conditions of all autonomous vehicles, travel routes, edge computing locations and demands for each locations.

Figure 2:
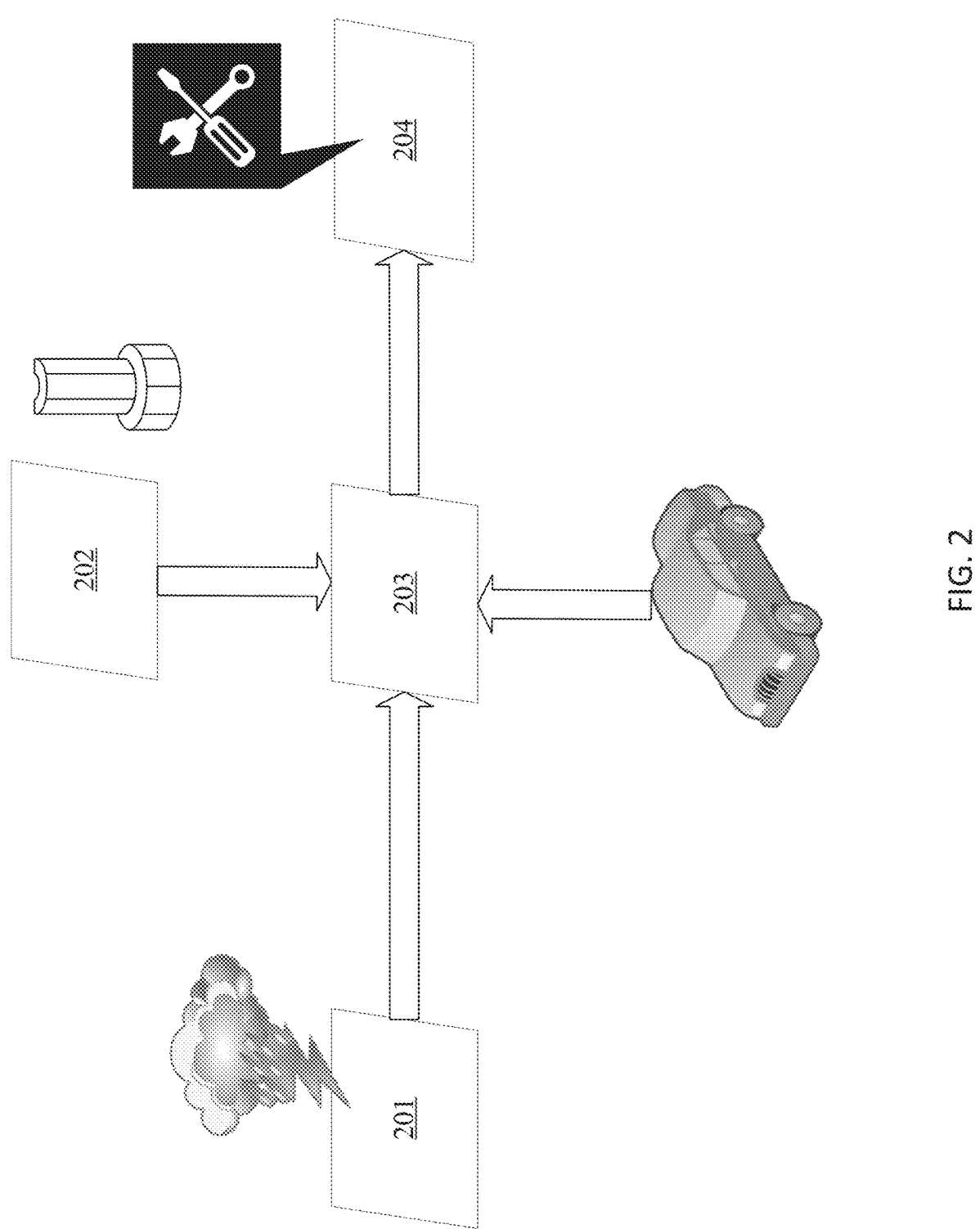
FIG. 2 is a functional block diagram illustrating the interactions between contextual situations/scenarios, various components and DT vehicle component 111, in accordance with an embodiment of the present invention.

FIG. 2 is a functional block diagram illustrating the data flow/interactions between contextual situations/scenarios, various components and DT vehicle component 111, in accordance with an embodiment of the present invention. Overall, DT vehicle component 111 can analyze contextual situations (e.g., adverse weather, traffic conditions, road conditions, etc.) associated with the road (201). Other data (202) are to be retrieved may include historically data from edge computing which includes edge resource consumption by various vehicle for different parameters (e.g., vehicle health, contextual situation, etc.). Based on data retrieved from 201 and 202, the data is analyzed and processed by 203 (i.e., DT vehicle component 111) and the output is sent to 204. Output from 204 can include, i) proactively maintenance of the vehicle (e.g., software upgrade, hardware upgrade, replace failing or mechanical/electro-mechanical parts near the end of its life span, ii) maintain of inputs gathering system of that high quality input data can be captured, and ii) upgrading processing modules/memory/etc. associated with edge computing infrastructure.

Figure 3:
FIG. 3 is a high-level flowchart illustrating the operation of DT vehicle component 111, designated as 300, in accordance with an embodiment of the present invention.
Figure 3:
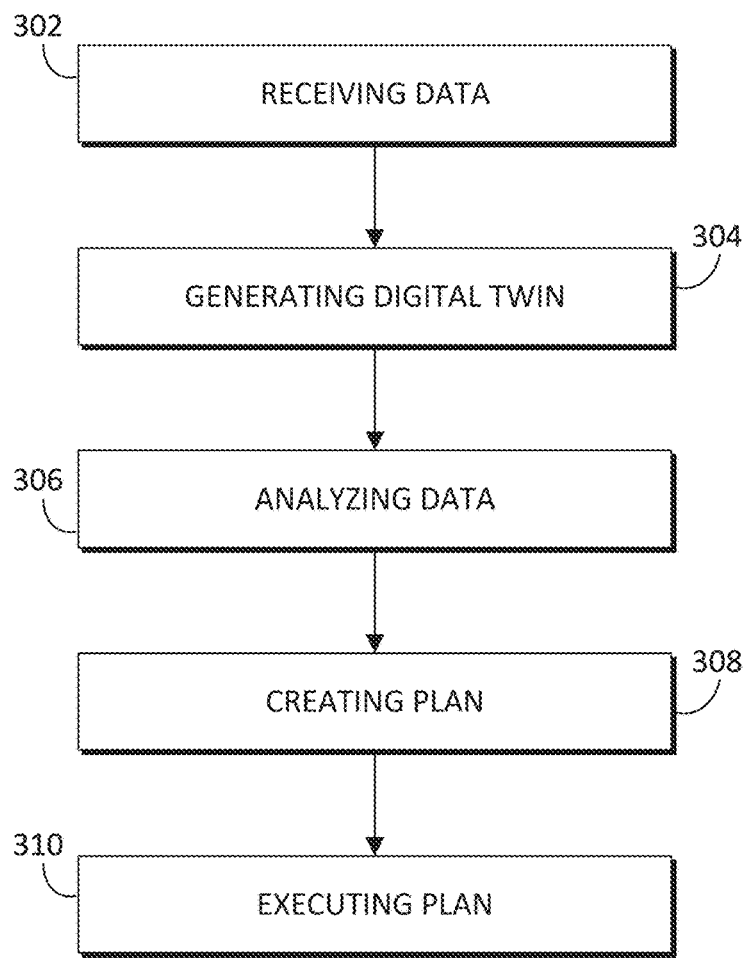

FIG. 3 is a flowchart illustrating the operation of DT vehicle component 111, designated as 300, in accordance with another embodiment of the present invention.

DT vehicle component 111 receives data (step 302). In an embodiment, DT vehicle component 111, through data component 121, receives various data from sensors, road conditions, autonomous vehicle, edge computing resources, etc. associated with one or more autonomous vehicle. For example, vehicle_1 is picking user_1 from Atlanta, Georgia to drop off user_1 in Miami, Florida. Thus, all data associated with the trip will be retrieved from various sources.

DT vehicle component 111 generates a digital twin (step 304). In an embodiment, DT vehicle component 111, through server interface component 122, generates a digital twin version of the autonomous vehicle that is traveling from one location to another with one or more passengers. Additionally, a digital twin version of edge computing resources can be created that is associated with the autonomous vehicle. It is noted that one wholly digital version (i.e., combined autonomous and edge computing) can be created instead of two separate versions for autonomous vehicle and edge computing. Once digital version(s) has been created then that version(s) is updated with the latest data (e.g., real time data from sensors and other data sources) in order to be as accurate as possible. For example, referring to the previous example of vehicle_1, a digital twin copy of vehicle_1 is generated along with the route from Atlanta to Miami.

DT vehicle component 111 analyzes data (step 306). In an embodiment, DT vehicle component 111, through analysis component 123, perform simulations related to the autonomous vehicle in order to minimize edge computing resources or any other requirement parameters deem necessary by the user. For example, referring to the previous example of vehicle_1, DT vehicle component 111 perform simulations on vehicle_1 based on the route from Atlanta to Miami.

DT vehicle component 111 creates one or more plans (step 308). In an embodiment, DT vehicle component 111, through plan output component 124, output recommendation/action plans based on the result of the analysis. A recommendation may include replacing a mechanical component of the autonomous vehicle before or during the journey in order to lessen the edge computational requirement. For example, referring to the previous example of vehicle_1, DT vehicle component 111 may recommend replacing a faulty lens on front cameras used by the full-service driving component of the vehicle. A new and clear lens can help with navigation and lessen the computational required to discern object identification (with a dirty lens, may require more edge computation).

DT vehicle component 111 executes one or more plans (step 310). In an embodiment, DT vehicle component 111, can execute the recommendation by instructing the autonomous vehicle to travel to the vehicle service center to have the parts replaced. For example, referring to the previous example of vehicle_1, DT vehicle component 111 may instruct vehicle_1 to proceed to the nearest service center before picking up user_1 instead of waiting to do so during the trip from Atlanta to Miami.

Other embodiments of the present invention may include the following detail highlights:

Each vehicle can identify uniquely, and can be identifying the edge resources of the vehicles, like processing and storage resources.

The proposed system can identify input gathering modules of each autonomous vehicle, like camera, various sensors, etc.

The vehicles can historically capture how the computing resources of any vehicle is used while the vehicles are running.

The proposed system can also capture the contextual situation of the surrounding, and how the contextual situation is driving the edge computing resource utilization.

The proposed system can also consider vehicle conditions, that includes mechanical performance, etc., and can identify the health of the machines.

The proposed system can have digital twin computing module, the digital twin computing system can identify how the edge computing resources are utilized.

The proposed system can perform digital twin simulation of each vehicle, and can identify edge computing capabilities.

The proposed system can identify travel route of any vehicle, basically average travel route, like in next 30 days, which route the vehicle can travel.

The proposed system can identify the contextual situation on the road, the context can be identified from crowd source information.

The proposed system can identify weather condition, vehicles can be travelling in any route etc.

Based on identified contextual situation on any route, the proposed system can be any type of computation required.

The proposed system can identify the contextual situation, and can identify types of data are to be captured/analyzed, historical data can be used.

Based on predicted contextual situation, the proposed system can be identifying how much volume of data are to be analyzed for the contextual situation.

The proposed system can perform digital twin simulation of the contextual situation and the vehicle driving to identify how much edge computing resource is required.

The proposed system can estimate how many vehicles can be available on the route and participating in the edge computing.

With digital twin simulation, the proposed system can estimate how much edge resource is required for any vehicle.

Based on the required edge resources to travel in the identified contextual situation, the proposed system can perform digital twin simulation of the vehicle.

Based on the digital twin simulation, the proposed system can identify if the vehicle can support required edge computing resources.

The proposed system can consider how the edge resources are consuming by the vehicle, and where the edge computing resource capability is to be improved.

The proposed system can recommend what types of maintenance is to be performed in the vehicle so that the vehicle can provide required edge resources while travelling in the road.

Figure 4:
FIG. 4 depicts a block diagram, designated as 400, of components of a server computer capable of executing the DT vehicle component 111 within the DT vehicle environment 100, in accordance with an embodiment of the present invention.

FIG. 4, designated as 400, depicts a block diagram of components of DT vehicle component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. DT vehicle component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., DT vehicle component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., DT vehicle component 111) used to practice embodiments of the present invention can be stored on such portable computer readable storage media and can be loaded onto persistent storage 405 via I/O interface(s) 406. I/O interface(s) 406 also connect to display 410.

Display 410 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for reducing edge computing resources associated with autonomous vehicle, the computer-implemented method comprising:

receiving data associated with autonomous vehicle;

generating a digital twin copy of the autonomous vehicle based on the received data, wherein the digital twin copy leverages artificial intelligence and machine learning and further comprising:

creating a first digital twin version of the autonomous vehicle on a digital twin platform;

creating a second digital twin version of an edge computing demand associated with the autonomous vehicle, wherein the edge computing demand requires computational capability of one or more edge computing resources associated with one or more travel route by the autonomous vehicle; and updating the first digital twin version and the second digital twin version with real-time data;

analyzing the digital twin copy, further comprising:

performing one or simulations based on travel requirement;

determining results of the one or more simulations meets the travel requirement; and determining a maintenance plan associated with he autonomous vehicle;

creating an action plan based on analysis; and executing the action plan.

2. The computer-implemented method of claim 1, wherein the data further comprises of health status of the autonomous vehicle, component status from maintenance and service data associated with the autonomous vehicle, sensors, autonomous vehicle location, location of user, weather pattern, traffic pattern, road conditions and travel route.

3. The computer-implemented method of claim 1, wherein the action plan can include identifying number of vehicles that needs maintenance based on analyzing edge computing capabilities of each, and every vehicle travelling through the route.

4. The computer-implemented method of claim 1, wherein the action plan can include identifying which part of the autonomous vehicle that needs maintenance.

5. The computer-implemented method of claim 1, wherein the travel requirement comprises of, reduction in resources of edge computing associated with the autonomous vehicle, minimizing vehicle down time due to non-functional parts, reducing travel time, maximizing passenger pickup during one trip, and reducing dead mileage.

6. The computer-implemented method of claim 1, wherein creating the action plan is based on the results of the one or more simulations meeting the travel requirement.

7. The computer-implemented method of claim 6, wherein the action plan comprises of, identifying optimum number of vehicles that needs maintenance, recommending which part of the vehicle needs, identifying optimum maintenance plan between vehicles and road and identifying types of input data connection modules.

8. A computer program product for reducing edge computing resources associated with autonomous vehicle, the computer program product comprising:

> one or more computer readable storage media and program instructions stored on the one or more computer readable storage media, the program instructions comprising:
>
>> program instructions to receive data associated with autonomous vehicle;
>>
>> program instructions to generate a digital twin copy of the autonomous vehicle based on the received data, wherein the digital twin copy leverages artificial intelligence and machine learning and further comprising:
>>
>>> program instructions to create a first digital twin version of the autonomous vehicle on a digital twin platform;
>>>
>>> program instructions to create a second digital twin version of an edge computing demand associated with the autonomous vehicle, wherein the edge computing demand requires computational capability of one or more edge computing resources associated with one or more travel route by the autonomous vehicle; and
>>>
>>> program instructions to update the first digital twin version and the second digital twin version with real-time data;
>>>
>> program instructions to analyze the digital twin copy, further comprising:
>>
>>> program instructions to perform one or simulations based on travel requirement;
>>>
>>> program instructions to determine results of the one or more simulations meets the travel requirement; and
>>>
>>> program instructions to determine a maintenance plan associated with he autonomous vehicle;
>>>
>> program instructions to create an action plan based on analysis; and
>>
>> program instructions to execute the action plan.

9. The computer program product of claim 8, wherein the data further comprises of health status of the autonomous vehicle, component status from maintenance and service data associated with the autonomous vehicle, sensors, autonomous vehicle location, location of user, weather pattern, traffic pattern, road conditions and travel route.

10. The computer program product of claim 8, wherein the action plan can include identifying number of vehicles that needs maintenance based on analyzing edge computing capabilities of each, and every vehicle travelling through the route.

11. The computer program product of claim 8, wherein the action plan can include identifying which part of the autonomous vehicle that needs maintenance.

12. The computer program product of claim 8, wherein the travel requirement comprises of, reduction in resources of edge computing associated with the autonomous vehicle, minimizing vehicle down time due to non-functional parts, reducing travel time, maximizing passenger pickup during one trip, and reducing dead mileage.

13. The computer program product of claim 8, wherein program instructions to create the action plan is based on the results of the one or more simulations meeting the travel requirement.

14. The computer program product of claim 13, wherein the action plan comprises of, identifying optimum number of vehicles that needs maintenance, recommending which part of the vehicle needs, identifying optimum maintenance plan between vehicles and the road and identifying types of input data connection modules.

15. A computer system for reducing edge computing resources associated with autonomous vehicle, the computer system comprising:

> one or more computer processors;
>
> one or more computer readable storage media; and
>
> program instructions stored on the one or more computer readable storage media for execution by at least one of the one or more computer processors, the program instructions comprising:
>
>> program instructions to receive data associated with autonomous vehicle;
>>
>> program instructions to generate a digital twin copy of the autonomous vehicle based on the received data, wherein the digital twin copy leverages artificial intelligence and machine learning and further comprising:
>>
>>> program instructions to create a first digital twin version of the autonomous vehicle on a digital twin platform;
>>>
>>> program instructions to create a second digital twin version of an edge computing demand associated with the autonomous vehicle, wherein the edge computing demand requires computational capability of one or more edge computing resources associated with one or more travel route by the autonomous vehicle; and
>>>
>>> program instructions to update the first digital twin version and the second digital twin version with real-time data;
>>>
>> program instructions to analyze the digital twin copy, further comprising:
>>
>>> program instructions to perform one or simulations based on travel requirement;
>>>
>>> program instructions to determine results of the one or more simulations meets the travel requirement; and
>>>
>>> program instructions to determine a maintenance plan associated with he autonomous vehicle;
>>>
>> program instructions to create an action plan based on analysis; and
>>
>> program instructions to execute the action plan.

16. The computer system of claim 15, wherein the data further comprises of health status of the autonomous vehicle, component status from maintenance and service data associated with the autonomous vehicle, sensors, autonomous vehicle location, location of user, weather pattern, traffic pattern, road conditions and travel route.

17. The computer system of claim 15, wherein the action plan can include identifying number of vehicles that needs maintenance based on analyzing edge computing capabilities of each, and every vehicle travelling through route.

18. The computer system of claim 15, wherein the action plan can include identifying which part of the autonomous vehicle that needs maintenance.

19. The computer system of claim 15, wherein the travel requirement comprises of, reduction in resources of edge computing associated with the autonomous vehicle, minimizing vehicle down time due to non-functional parts, reducing travel time, maximizing passenger pickup during one trip, and reducing dead mileage.

20. The computer system of claim 15, wherein the action plan comprises of, identifying optimum number of vehicles that needs maintenance, recommending which part of the vehicle needs, identifying optimum maintenance plan between vehicles and road and identifying types of input data connection modules.

\* \* \* \* \*